US012317216B2

(12) United States Patent
Liu et al.

(10) Patent No.: US 12,317,216 B2
(45) Date of Patent: May 27, 2025

(54) METHOD TO SPEED UP 5GNR SA NETWORK REGISTER FOR DUAL-SIM DEVICE DURING ROAMING

(71) Applicant: QUALCOMM Incorporated, San Diego, CA (US)

(72) Inventors: Yi Liu, Shenzhen (CN); Jinglin Zhang, Guangdong (CN); Haojun Wang, Xian (CN); Fojian Zhang, Shenzhen (CN); Zhenqing Cui, Shanghai (CN); Hong Wei, Shanghai (CN); Jian Li, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 348 days.

(21) Appl. No.: 17/904,417

(22) PCT Filed: Apr. 16, 2020

(86) PCT No.: PCT/CN2020/085039
§ 371 (c)(1),
(2) Date: Aug. 17, 2022

(87) PCT Pub. No.: WO2021/207996
PCT Pub. Date: Oct. 21, 2021

(65) Prior Publication Data
US 2023/0076240 A1 Mar. 9, 2023

(51) Int. Cl.
*H04W 60/04* (2009.01)
*H04W 8/18* (2009.01)
*H04W 84/04* (2009.01)

(52) U.S. Cl.
CPC .......... *H04W 60/04* (2013.01); *H04W 8/183* (2013.01); *H04W 84/042* (2013.01)

(58) Field of Classification Search
CPC ... H04W 60/04; H04W 8/183; H04W 84/042; H04W 48/18; H04W 60/00; H04W 88/06; H04W 48/16
See application file for complete search history.

(56) References Cited

U.S. PATENT DOCUMENTS 10,517,039 B1 * 12/2019 Wu ..................... H04B 17/318
11,825,556 B2 * 11/2023 Lu ........................... H04W 8/18
(Continued)

FOREIGN PATENT DOCUMENTS

| CN | 102984788 A | 3/2013 |
| CN | 110636589 A | 12/2019 |

(Continued)

OTHER PUBLICATIONS

Supplementary European Search Report—EP20930722—Search Authority—Munich—Dec. 6, 2023 10 pages.
(Continued)

*Primary Examiner* — Habte Mered
(74) *Attorney, Agent, or Firm* — Dinsmore & Shohl LLP

(57) ABSTRACT

Embodiments include systems and methods for supporting registration in a fifth generation (5G) new radio (NR) (5GNR) standalone (SA) network by a processor of a multi-subscriber identity module (SIM) wireless device configured with a first subscription and a second subscription. Various embodiments may include determining whether the first subscription received a shared mobile country code (MCC) from the second subscription and the shared MCC is different than an MCC of a home public land mobile network (HPLMN) of the first subscription in response to preforming a full band scan of frequencies supporting the first subscription, and stopping the full band scan by the first subscription and scanning a 5GNR band associated with the shared MCC in response to determining that the first subscription received the shared MCC from the second sub- (Continued)

scription and the shared MCC is different than the MCC of the HPLMN of the first subscription.

30 Claims, 9 Drawing Sheets

(56) References Cited

U.S. PATENT DOCUMENTS

| | | | | |
|---|---|---|---|---|
| 2015/0004966 A1* | 1/2015 | Ayleni | ................. | H04W 48/16 |
| | | | | 455/433 |
| 2015/0341846 A1* | 11/2015 | Shi | ....................... | H04W 64/00 |
| | | | | 455/434 |
| 2019/0159116 A1* | 5/2019 | Guan | ................... | H04W 60/00 |
| 2020/0359200 A1* | 11/2020 | Lu | ......................... | H04W 8/183 |
| 2021/0084576 A1* | 3/2021 | Zhu | ...................... | H04W 48/16 |

FOREIGN PATENT DOCUMENTS

| | | |
|---|---|---|
| CN | 110798877 A | 2/2020 |
| WO | 2015092495 A1 | 6/2015 |
| WO | 2017084074 A1 | 5/2017 |
| WO | WO-2020247043 A1 * 12/2020 | ............ H04W 12/45 |

OTHER PUBLICATIONS

International Search Report and Written Opinion—PCT/CN2020/085039—ISA/EPO—Jan. 22, 2021; 9 pages.

* cited by examiner

METHOD TO SPEED UP 5GNR SA NETWORK REGISTER FOR DUAL-SIM DEVICE DURING ROAMING

BACKGROUND

Long Term Evolution (LTE), Fifth Generation (5G) new radio (NR)(5GNR), and other recently developed communication technologies allow wireless devices to communicate information at data rates (e.g., in terms of Gigabits per second, etc.) that are orders of magnitude greater than what was available just a few years ago.

The different available communication technologies, such as LTE, 5GNR, etc., are enabling many different network implementations and offering different types of networks in the same geographic areas, such as the same countries. For example, one implementation option for 5GNR networks being adopted is a 5GNR standalone (SA) network in which a 5G radio access network (RAN) and 5G core network provide 5GNR services in geographic area, such as a country. As such, 5GNR SA networks can overlap coverage in the geographic area, such as the country, with LTE networks.

As there can be multiple different networks (e.g., 5GNR SA networks and LTE networks) available in a geographic area, such as a country, increasingly, wireless devices may employ a variety of methods for achieving network connections, and enable users to access multiple services from different networks. Multi-subscriber identity module (SIM) wireless devices have become increasingly popular because of the versatility that such devices provide. For example, a multi-SIM multi-standby (MSMS) wireless device enables at least two SIMs to be in idle mode waiting to begin communications, but only allows one SIM at a time to participate in an active communication due to sharing of a single radio frequency (RF) resource (e.g., a wireless transceiver). As a specific example, a MSMS device with at least a first subscription supported by a 5GNR SIM and a second subscription supported by an LTE SIM has become increasingly popular because such a MSMS device can support 5GNR SA network connections via the 5GNR SIM and LTE network connections via the LTE SIM.

SUMMARY

Various aspects include systems and methods for supporting registration in a fifth generation (5G) new radio (NR) (5GNR) standalone (SA) network by a processor of a multi-subscriber identity module (SIM) wireless device configured with a first subscription and a second subscription. Various aspects may include performing a full band scan of frequencies supporting the first subscription in response to determining that the first subscription failed to register with a 5GNR cell during an acquisition database (ACQ-DB) scan of frequencies supporting the first subscription, determining whether the first subscription received a shared mobile country code (MCC) from the second subscription and the shared MCC is different than an MCC of a home public land mobile network (HPLMN) of the first subscription in response to performing the full band scan of frequencies supporting the first subscription, and stopping the full band scan of frequencies supporting the first subscription and scanning a 5GNR band associated with the shared MCC by the first subscription in response to determining that the first subscription received the shared MCC from the second subscription and that the shared MCC is different than the MCC of the HPLMN of the first subscription.

Various aspects may further include providing the shared MCC from the second subscription to the first subscription in response to the second subscription detecting a public land mobile network (PLMN) identifier of a Long Term Evolution (LTE) network during an LTE network search operation by the second subscription, wherein the shared MCC is an MCC included in the PLMN identifier of the LTE network. In some aspects, the ACQ-DB scan by the first subscription and the LTE network search operation by the second subscription may occur at least partially concurrently.

In some aspects, stopping the full band scan of frequencies supporting the first subscription and scanning the 5GNR band associated with the shared MCC by the first subscription in response to determining that the first subscription received the shared MCC from the second subscription and the shared MCC is different than the MCC of the HPLMN of the first subscription may include stopping the full band scan of frequencies supporting the first subscription in response to determining that the first subscription received the shared MCC from the second subscription and that the shared MCC is different than the MCC of the HPLMN of the first subscription, determining the 5GNR band associated with the shared MCC based at least in part on an MCC to band mapping table in response to stopping the full band scan of frequencies supporting the first subscription, and scanning the 5GNR band associated with the shared MCC by the first subscription. In some aspects, the MCC to band mapping table may be a configurable table correlating MCCs and 5GNR bands stored in a memory of the multi-SIM wireless device.

Various aspects may further include registering by the first subscription to a 5GNR SA network operating in the 5GNR band in response to scanning the 5GNR band associated with the shared MCC.

In some aspects, the first subscription may be associated with a 5GNR SIM and the second subscription is associated with an LTE SIM. In some aspects, the 5GNR SIM and the LTE SIM may share a radio frequency (RF) resource.

Further aspects may include a wireless device having a processor configured to perform one or more operations of any of the methods summarized above. Further aspects may include a non-transitory processor-readable storage medium having stored thereon processor-executable instructions configured to cause a processor of a wireless device to perform operations of any of the methods summarized above. Further aspects include a wireless device having means for performing functions of any of the methods summarized above. Further aspects include a system-on-chip for use in a wireless device that includes a processor configured to perform one or more operations of any of the methods summarized above. Further aspects include a system in a package that includes two systems on chip for use in a wireless device that includes a processor configured to perform one or more operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
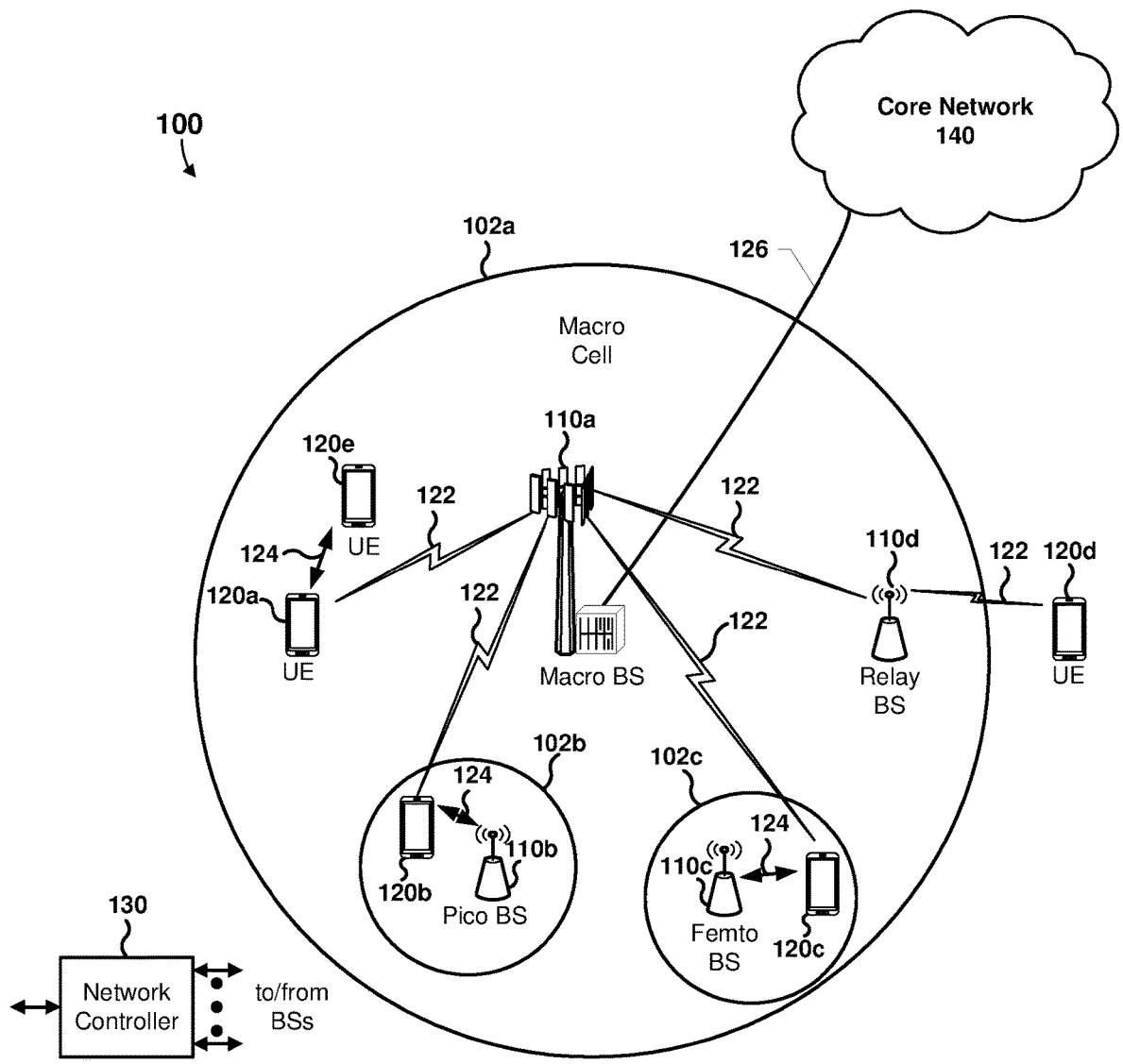
FIG. 1 is a system block diagram illustrating an example communication system suitable for implementing any of the various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

Various embodiments include systems and methods for supporting registration in a fifth generation (5G) new radio (NR) (5GNR) standalone (SA) network by a processor of a multi-subscriber identity module (SIM) wireless device configured with a first subscription and a second subscription. Various embodiments may improve user experience by reducing the time required for 5GNR SA network registration, especially on multi-SIM wireless devices having two or more SIMs sharing a radio frequency (RF) resource. Various embodiments may reduce the time required for 5GNR SA network registration by focusing band scanning to a 5GNR band associated with a shared mobile country code (MCC). Focusing band scanning on a 5GNR band associated with a shared mobile country code (MCC) may enable registration with a 5GNR SA network faster than registration would occur in current wireless devices that require full band scanning to attempt registration with a 5GNR SA network. Further, focusing band scanning on a 5GNR band associated with a shared MCC may reduce band scan time and/or save power consumption in comparison to the time and/or power consumption used in full band scanning various embodiments may speed up 5GNR SA network registration operations in comparison to current systems when a wireless device, especially a multi-SIM multi-standby (MSMS) wireless device, is roaming and therefore outside of the device's home public land mobile network (HPLMN). The faster 5GNR SA network registration enabled by the various embodiments may provide an improved user experience.

The term "wireless device" is used herein to refer to any one or all of cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, wireless router devices, wireless appliances, medical devices and equipment, biometric sensors/devices, wearable devices including smart watches, smart clothing, smart glasses, smart wrist bands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system-on-chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the terms "SIM," "SIM card," and "subscriber identity module" may interchangeably refer to a memory that may be an integrated circuit or embedded into a removable card, and that stores an International Mobile Subscriber Identity (IMSI), related key, and/or other information used to identify and/or authenticate a wireless device on a network and enable a communication service with the network. Examples of SIMs include the Universal Subscriber Identity Module (USIM) provided for in the Long Term Evolution (LTE) 3GPP standard, and the Removable User Identity Module (R-UIM) provided for in the 3GPP2 standard. Universal Integrated Circuit Card (UICC) is another term for SIM. Moreover, a SIM may also refer to a virtual SIM (VSIM), which may be implemented as a remote SIM profile loaded in an application on a wireless device, and enabling normal SIM functions on the wireless device.

Because the information stored in a SIM enables the wireless device to establish a communication link for a particular communication service or services with a particular network, the term "SIM" is also be used herein as a shorthand reference to the communication service associated with and enabled by the information stored in a particular SIM as the SIM and the communication network, as well as the services and subscriptions supported by that network, correlate to one another. Similarly, the term SIM may also be used as a shorthand reference to the protocol stack and/or modem stack and communication processes used in establishing and conducting communication services with subscriptions and networks enabled by the information stored in a particular SIM.

As used herein, the terms "multi-SIM multi-standby communication device," "MSMS wireless device," "dual-SIM dual standby," and "DSDS wireless device" may interchangeably describe a wireless device that is configured with more than one SIM and allows idle-mode operations to be performed on two networks simultaneously, as well as selective communication on one network while performing idle-mode operations on at least one other network. Dual-SIM dual-standby (DSDS) communication devices are an example of a type of MSMS communication devices.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), IEEE 802.11 (WiFi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards.

As used herein, the term "RF resource" refers to the components in a communication device that send, receive, and decode radio frequency signals. An RF resource typically includes a number of components coupled together that transmit RF signals that are referred to as a "transmit chain," and a number of components coupled together that receive and process RF signals that are referred to as a "receive chain."

LTE is a mobile network standard for 4G wireless communication of high-speed data developed by the 3GPP (3rd Generation Partnership Project) and specified in its Release 8 document series. In contrast to the circuit-switched (CS) model of cellular network standards, LTE has been designed to support only packet-switched (PS) services. Data services in LTE may be provided over the Internet, while multimedia services may be supported by the IP Multimedia Core Network Subsystem (IMS) framework. The LTE standard is based on the evolution of the Universal Mobile Telecommunications System (UMTS) radio access through the Evolved Universal Terrestrial Radio Access Network (E-UTRAN). The E-UTRAN together with the Evolved Packet Core (EPC) network (core network accommodating LTE) make up an Evolved Packet System (EPS). While the access network in UMTS emulates a circuit-switched connection for real time services and a packet-switched connection for datacom services, the Evolved Packet System (EPS) is purely Internet Protocol (IP) based, and both real time services and datacom services are carried by the IP protocol.

The 5G system is an advanced technology from 4G LTE, and provides a new radio access technology (RAT) through the evolution of the existing mobile communication network structure. A 5G system may support, for example, extended LTE (eLTE) as well as non-3GPP access (e.g., WLAN). One implementation option for 5GNR networks being adopted is a 5GNR standalone (SA) network in which a 5G radio access network (RAN) and 5G core network provide 5GNR services in geographic area, such as a country. As such, 5GNR SA networks can overlap coverage in the geographic area, such as the country, with LTE networks.

In 3GPP, geographic areas, such as countries, are associated with MCCs that identify the geographic area. Different countries may have different MCCs assigned. Networks operating in a geographic area, whether LTE networks, 5GNR SA networks, or other type 3GPP networks, may be uniquely identified by public land mobile network (PLMN) identifiers (PLMN IDs). The PLMN ID may be a combination of the MCC of the geographic area in which the network is operating and the mobile network code (MNC) assigned to the network. As typically only one MCC is assigned to a geographic area, the PLMN IDs of all networks operating in the same geographic area may include the same MCC, regardless of the type of network. As a specific example, an LTE network operating in a country may have a first unique PLMN ID that includes that country's MCC and a 5GNR SA network operating in that same country may have a second unique PLMN ID that also includes the country's same MCC. A subscription of a wireless device may be assigned an HPLMN that corresponds to the PLMN ID of the network of the service provider supporting that subscription. When operating in any PLMN other than the HPLMN, the wireless device using the subscription may be operating in a roaming mode. Typically, a wireless device may store information supporting fast registration in the HPLMN, such as an acquisition-database (ACQ-DB) relating frequencies on which the subscription is likely to find a signal for acquiring service in the HPLMN. Outside of the HPLMN, such as when roaming, the subscription may not have information in an ACQ-DB to assist in finding a signal of another PLMN that is not the HPLMN.

Modern wireless devices may now include a plurality of SIM cards that enable a user to connect to different mobile networks with the same mobile communication device. The plurality of SIM cards may enable the wireless device to communicate with different networks simultaneously. As an example, the wireless device may communicate with a 5GNR SA network using information stored in a 5GNR SIM associated with a first subscription and an LTE network using information stored in an LTE SIM associated with a second network. Each SIM card stores information that serves to identify and authenticate a subscriber using a particular mobile communication device, and each SIM card is associated with only one subscription. For example, a SIM card may be associated with a subscription to one of a GSM, TD-SCDMA, CDMA2000, and/or WCDMA system. Further, multi-SIM operations may be applicable to any of a number of wireless communication systems, using various multiple access schemes, such as, but not limited to, CDMA, FDMA, OFDMA, or TDMA. Each SIM in a wireless device is configured with its own mobile subscription identification number (MSIN) (also called the mobile identification number (MIN), and/or mobile station identification (MSID)), which is the 10-digit unique number that the wireless carrier uses to identify the device.

Normal RF resource arbitration may be employed to schedule use of a shared RF resource between SIMs on an MSMS wireless device. In an MSMS device in which the shared RF resource is used for an active communication in a service enabled by one SIM, communications with a service enabled by one or more other SIMs may be in an idle mode and not actively contending for access to the RF resource. However, the MSMS device may maintain a connection with a serving network associated with the other SIM(s) in order to perform limited activities (e.g., "idle mode activities"). Depending on the communication protocol, examples of idle mode activates may include monitoring system information, receiving paging messages, measuring signal strength of neighbor cells, etc. As MSMS devices may maintain connections for two or more serving networks, especially when MSMS devices are powered on, reenter a service area, or otherwise need to restart services, the MSMS device may initiate network registration operations on one or more of its subscriptions, such as all of its subscriptions.

In current systems, 5GNR SA mode register speeds can be slow, especially in cases where a wireless device cannot find a suitable cell from an acquisition-database (ACQ-DB) scan and, therefore, needs to perform a full band scan. This need to perform a full band scan often occurs in roaming situations as the wireless device may not store cell information in an ACQ-DB for cells outside of the home PLMN (HPLMN) of the wireless device.

In 5GNR SA network implementations, the synchronization signal block (SSB) often is not located at the center frequency of the carrier, and there are often many bands in use for 5GNR. Without any valid band and/or frequency information, such as when an ACQ-DB scan fails during roaming, a wireless device may need to scan all Global Synchronization Channel Numbers (GSCNs) of all bands supported by the wireless device one by one in a full band scan to attempt to register and establish communications with a 5GNR SA network. Such a full band scan of all GSCNs of all bands supported by the wireless device one by one may result in a very long time needed for registering to 5GNR SA network. In wireless device platforms that support multi-SIM operations (e.g., DSDS wireless devices), the register time in a dual-SIM case can be even longer than a single-SIM case as the two subscriptions associated with the two SIMs need to share the RF resource.

Various embodiments may speed up 5GNR SA network registration, especially in a dual-SIM implementation, by enabling information sharing between subscriptions, such as information sharing between an LTE subscription and a 5GNR subscription. In various embodiments, a subscription detecting a PLMN from any radio access technology (RAT), may share that PLMN information, such as the MCC included in the PLMN, with one or more other subscriptions of the wireless device. Various embodiments may include determining whether a first subscription, such as a 5GNR subscription associated with a 5GNR SIM, received a shared MCC from a second subscription, such as an LTE subscription associated with an LTE SIM, and whether the shared MCC is different than an MCC of a HPLMN of the first subscription in response to initiating a full band scan of frequencies supporting the first subscription, and then stopping a full band scan by a first subscription, such as a 5GNR subscription associated with a 5GNR SIM, and scanning a 5GNR band associated with a shared MCC by the first subscription in response to determining that the first subscription received the shared MCC from a second subscription, such as an LTE subscription associated with an LTE SIM, and the shared MCC is different than the MCC of the HPLMN of the first subscription.

In many circumstances a 4G subscription, such as a subscription associated with an LTE SIM, will detect a PLMN faster than a 5GNR subscription, such as a subscription associated with a 5GNR SIM. This is because in LTE the SSB is always located at the center of the carrier, while in 5GNR, which includes more bands than LTE, the SSB often is not located at the center frequency of the carrier. Such an LTE subscription may determine the PLMN identifier (PLMN ID) of a detected network from the LTE system information block one (SIB-1) transmitted by the cells of the LTE network. In various embodiments, the shared MCC may be determined from the PLMN identifier from a second subscription, such as an LTE subscription associated with an LTE SIM, and shared with other subscriptions, such as a 5GNR subscription associated with a 5GNR SIM, in response to the second subscription detecting a PLMN identifier of an LTE network during an LTE network search operation by the second subscription. In various embodiments, the shared MCC may be an MCC included in the PLMN identifier of the LTE network.

In some embodiments, a wireless device may maintain an MCC to band mapping table. The MCC to band mapping table may correlate MCCs to 5GNR bands. In some embodiments, a 5GNR band associated with a shared MCC may be determined based at least in part on the MCC to band mapping table. For example, once a shared MCC is determined by a subscription, that shared MCC may be compared to the MCC to band mapping table to find the MCC in the MCC to band mapping table matching the shared MCC. The 5GNR band associated with the MCC matching the shared MCC may be determined to be the 5GNR band associated with the share MCC.

In various embodiments, in response to determining that a first subscription received a shared MCC from a second subscription and the shared MCC is different than an MCC of a HPLMN of the first subscription, a full band scan of frequencies supporting the first subscription may be stopped and a 5GNR band associated with the shared MCC may be scanned by the first subscription. For example, during a full band scan procedure, a 5GNR subscription may receive a shared MCC from another subscription, such as an LTE subscription, and the shared MCC may be determined to not be the same as the MCC of 5GNR subscription's HPLMN. In response, the full band scan of frequencies supporting the 5GNR subscription may be stopped and the 5GNR band mapped to the shared MCC may be scanned. In this manner, scanning of bands and/or GSCNs not associated with the shared MCC may be skipped by the first subscription. The skipping of scanning of bands and/or GSCNs not associated with the shared MCC may reduce the number of bands need to scan significantly in comparison to full band scanning and may speed up the 5GNR SA mode registration in comparison to registration attempted with full band scanning.

To illustrate various embodiments, consider the example of a user roaming from Australia (MCC 505) to China (MCC 460) with a multi-SIM wireless device that supports a 5GNR subscription and an LTE subscription. Upon activating the wireless device in China, the LTE subscription may detect the China MCC 460 service faster than service supporting the 5GNR subscription. The China MCC 460 may be the shared MCC as all networks operating in China have the same MCC 460 as part of their respective PLMNs. A processor in the wireless device may share the MCC 460 with the 5GNR subscription executing in the wireless device. In response, the 5GNR subscription may stop current full band scan operations and only scan the 5GNR bands associated with the shared MCC 460, such as band N41/N78/N79 mapping to shared MCC 460. This scanning of only the 5GNR band associated with the shared MCC (reduced from all supported bands attempted in the stopped full band scan) may result in the 5GNR subscription registering to a 5GNR SA network much faster than if a full band scan had been completed.

FIG. 1 is a system block diagram illustrating an example communication system 100 suitable for implementing any of the various embodiments. The communications system 100 may be a 5G New Radio (NR) network, or any other suitable network, such as an LTE network 5GNR SA network, etc.

The communications system 100 may include a heterogeneous network architecture that includes a core network 140 and a variety of mobile devices (illustrated as wireless device 120a-120e in FIG. 1). The communications system 100 may also include a number of base stations (illustrated as the BS 110a, the BS 110b, the BS 110c, and the BS 110d) and other network entities. A base station is an entity that communicates with wireless devices (mobile devices), and also may be referred to as a Node B, an LTE Evolved nodeB (eNodeB or eNB), an access point (AP), a Radio head, a transmit receive point (TRP), a New Radio base station (NR BS), a 5G NodeB (NB), a Next Generation NodeB (gNodeB or gNB), or the like. Each base station may provide communication coverage for a particular geographic area. In 3GPP, the term "cell" can refer to a coverage area of a base station, a base station Subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a mobile device) and transmit the data to a downstream station (for example, a wireless device or a base station). A relay station also may be a mobile device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communications system 100, and each wireless device may be stationary or mobile. A wireless device also may be referred to as an access terminal, a terminal, a mobile station, a subscriber unit, a station, etc.

A macro base station 110a may communicate with the communication network 140 over a wired or wireless communication link 126. The wireless devices 120a, 120b, 120c may communicate with a base station 110a-110d over a wireless communication link 122.

The wireless communication links 122, 124 may include a plurality of carrier signals, frequencies, or frequency bands, each of which may include a plurality of logical channels. The wireless communication links 122 and 124 may utilize one or more Radio access technologies (RATs). Examples of RATs that may be used in a wireless communication link include 3GPP LTE, 3G, 4G, 5G (e.g., NR), GSM, CDMA, WCDMA, Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum Resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 Resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as a new Radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR Resource blocks may span 12 sub-carriers with a sub-carrier bandwidth of 75 kHz over a 0.1 millisecond (ms) duration. Each Radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some mobile devices may be considered machine-type communication (MTC) or Evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. A wireless device 120a-e may be included inside a housing that houses components of the wireless device, such as processor components, memory components, similar components, or a combination thereof.

In general, any number of communication systems and any number of wireless networks may be deployed in a given geographic area. Each communications system and wireless network may support a particular Radio access technology (RAT) and may operate on one or more frequencies. A RAT also may be referred to as a Radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed.

Figure 2:
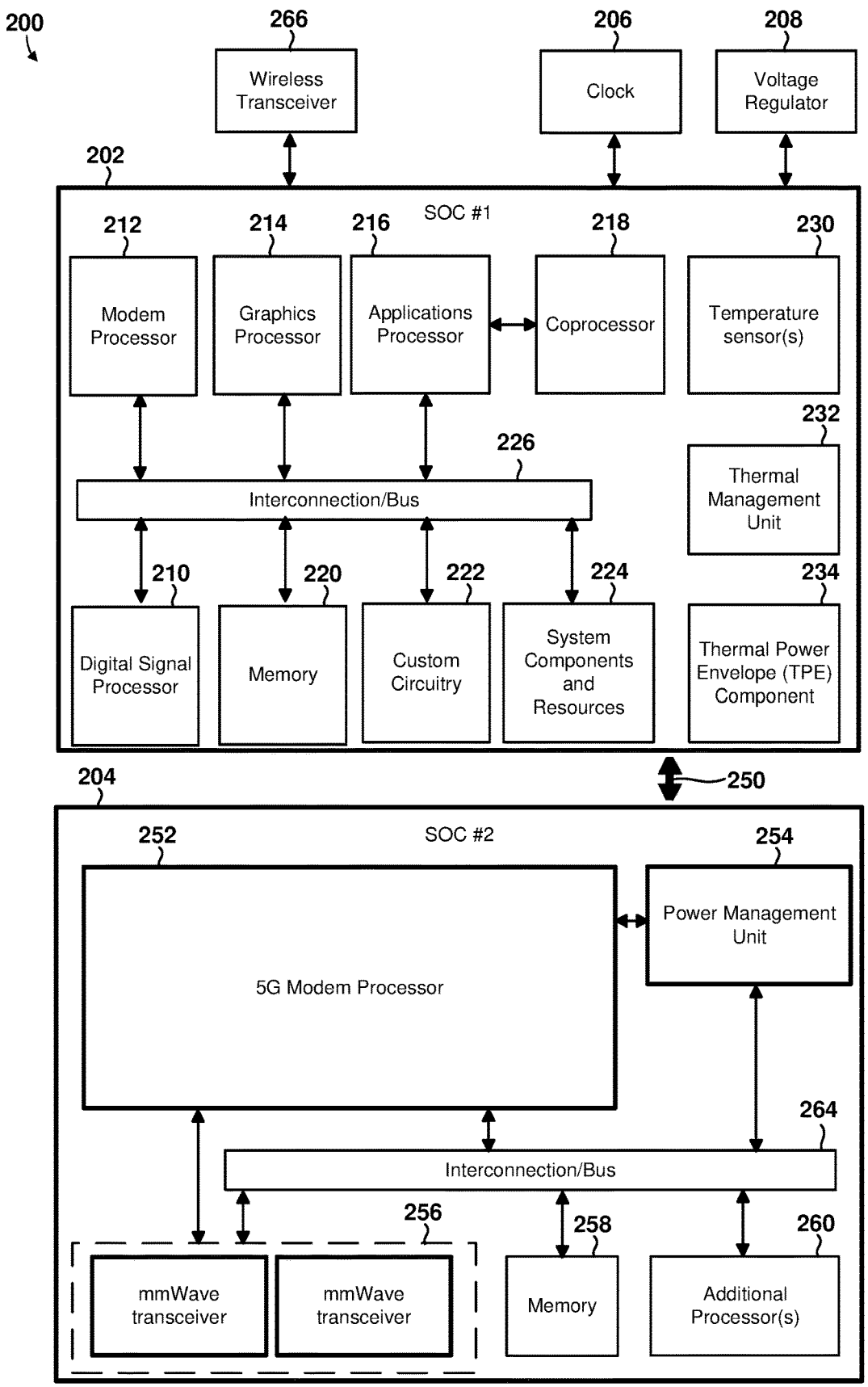
FIG. 2 is a component block diagram illustrating an example computing and wireless modem system suitable for implementing any of the various embodiments.

In some embodiments, two or more mobile devices 120a-e (for example, illustrated as the wireless device 120a and the wireless device 120e) may communicate directly using one or more sidelink channels 124 (for example, without using a base station 110 as an intermediary to communicate with one another). For example, the wireless devices 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-e may perform scheduling operations, Resource selection operations, as well as other operations described elsewhere herein as being performed by the base station 110a FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1 and 2, the illustrated example computing system 200 (which may be a SIP in some embodiments) includes a two SOCs 202, 204 coupled to a clock 206, a voltage regulator 208, and a wireless transceiver 266 configured to send and receive wireless communications via an antenna (not shown) to/from wireless devices, such as a base station 110a. In some embodiments, the first SOC 202 operate as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, the plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
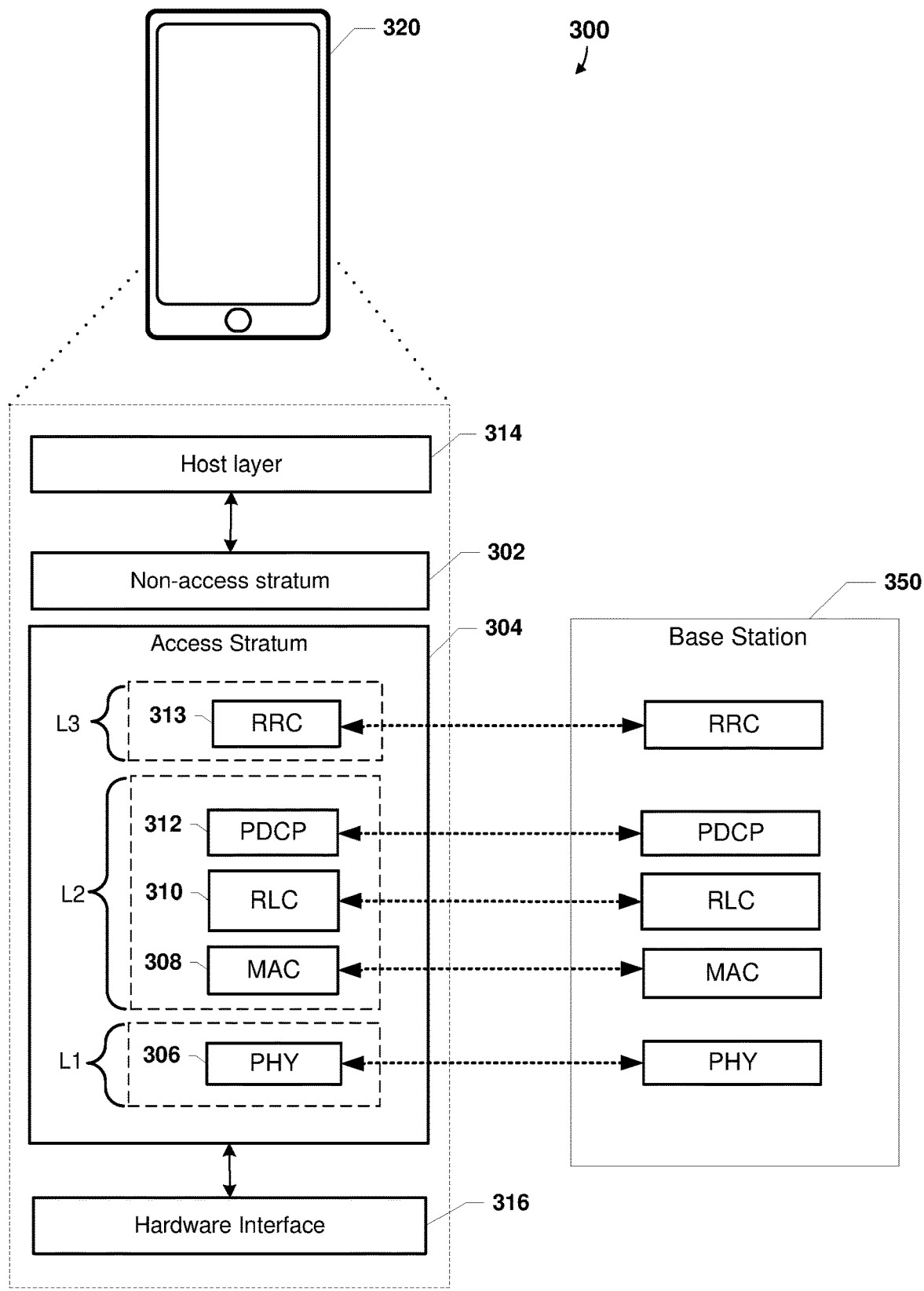
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments. With reference to FIGS. 1-3, the wireless device 320 may implement the software architecture 300 to facilitate communication between a wireless device 320 (e.g., the wireless device 120a-120e, 200) and the base station 350 (e.g., the base station 110a) of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one Radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support Packet filtering, security management, mobility control, session management, and traffic and signaling between a SIM(s) of the wireless device (e.g., SIM(s) 204) and its core network 140. The AS 304 may include functions and protocols that support communication between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In the various embodiments, Layer 2 may include a Media Access Control (MAC) sublayer 308, a Radio link Control (RLC) sublayer 310, and a Packet data convergence protocol (PDCP) 312 sublayer, each of which form logical connections terminating at the base station 350.

In the control plane, Layer 3 (L3) of the AS 304 may include a Radio Resource Control (RRC) sublayer 3. While not shown, the software architecture 300 may include additional Layer 3 sublayers, as well as various upper layers above Layer 3. In various embodiments, the RRC sublayer 313 may provide functions including broadcasting system information, paging, and establishing and releasing an RRC signaling connection between the wireless device 320 and the base station 350.

In various embodiments, the PDCP sublayer 312 may provide uplink functions including multiplexing between different Radio bearers and logical channels, sequence number addition, handover data handling, integrity protection, ciphering, and header compression. In the downlink, the PDCP sublayer 312 may provide functions that include in-sequence delivery of data packets, duplicate data Packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and the general purpose processor 206.

In other embodiments, the software architecture 300 may include one or more higher logical layer (e.g., transport, session, presentation, application, etc.) that provide host layer functions. For example, in some embodiments, the software architecture 300 may include a network layer (e.g., IP layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more RF transceivers).

Figure 4:
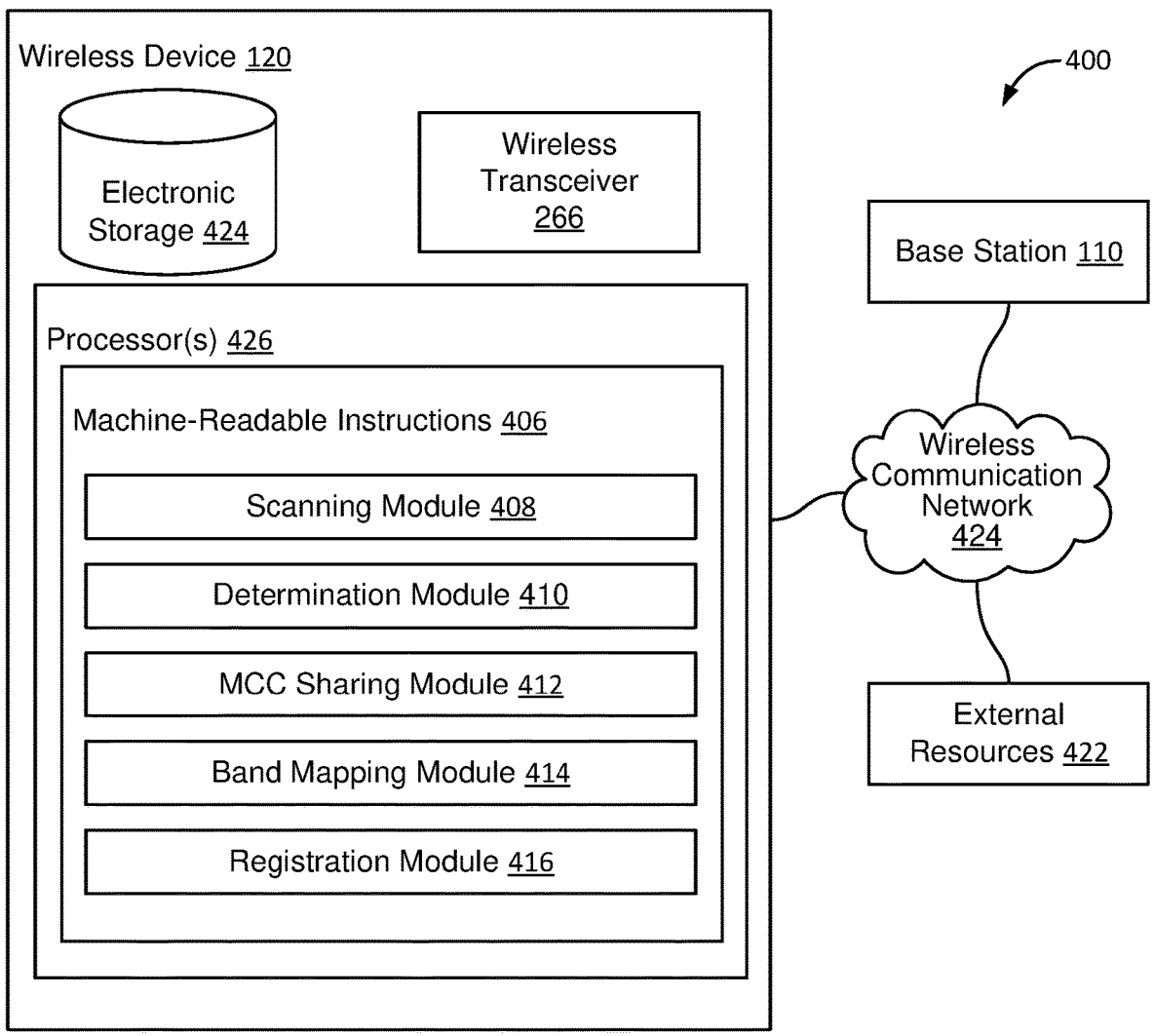
FIG. 4 is a component block diagram illustrating a system configured for wireless communication in accordance with various embodiments.

FIG. 4 is a component block diagram illustrating a communication system 400 configured for wireless communication in accordance with various embodiments. With reference to FIGS. 1-4, the communication system 400 may include one or more wireless devices 120 and one or more base stations 110 forming a wireless communication network 424, which may provide connections to external resources 422. External resources 422 may include sources of information outside of system 400, external entities participating with the system 400, and/or other resources.

A wireless device 120 may be configured by machine-readable instructions 406. Machine-readable instructions 406 may include one or more instruction modules. The instruction modules may include computer program modules. The instruction modules may include one or more of scanning module 408, determination module 410, MCC sharing module 412, band mapping module 414, registration module 416, and/or other instruction modules.

The scanning module 408 may be configured to initiate network registration operations. Network registration operations may include scanning operations to register with a network via one or more subscriptions of the wireless device 120. Network registration operations may be triggered in response to various events, including the wireless device being powered on or restarted, reentering a service area, or otherwise need to restart services on one or more subscriptions.

The scanning module 408 may be configured to perform a ACQ-DB scan by a first subscription, such as an ACQ-DB scan by a 5GNR subscription associated with a 5GNR SIM. The ACQ-DB scan may attempt to register the first subscription with a 5GNR cell. As an example, the ACQ-DB scan may attempt to locate a 5GNR SSB in a 5GNR band associated with a HPLMN and/or a last 5GNR cell the wireless device was camped on. The scanning module 408 may be configured to perform an LTE network search operation by a second subscription, such as an LTE network search operation by an LTE subscription associated with an LTE SIM. The LTE network search operation may include locating an LTE SSB on an LTE carrier. The scanning module 408 may be configured such that the ACQ-DB scan by the first subscription and the LTE network search operation by the second subscription occur at least partially concurrently. For example, the first subscription and the second subscription may perform a ACQ-DB scan and LTE network search operation concurrently by alternating use of a RF resource until one or both of the subscriptions register with a respective network. The scanning module 408 may be configured to register a subscription with a network and/or a cell of a network. The scanning module 408 may be configured to perform a full band scan of all 5GNR bands supported by the wireless device 120. A full band scan may be a scan of all GSCNs of all bands supported by the wireless device 120. The scanning module 408 may be configured to stop scanning by subscriptions of the wireless device 120. The scanning module 408 may be configured to scan a 5GNR band associated with a shared MCC.

The determination module 410 may be configured to determine whether a subscription is registered with a 5GNR cell. The determination module 410 may be configured to determine whether a PLMN identifier is detected by a subscription. The determination module 410 may be configured to determine a shared MCC from a PLMN identifier. The determination module 410 may be configured to determine a PLMN identifier of a network based on signaling from the network, such as a PLMN identifier in a SIB 1. The determination module 410 may be configured to extract an MCC from a PLMN identifier to determine a shared MCC from the PLMN identifier. The determination module 410 may be configured to determine whether a first subscription received a shared MCC from a second subscription and the shared MCC is different than an MCC of a HPLMN of the first subscription. For example, the determination module 410 may determine whether a value is stored in a memory location dedicated to storing shared MCCs and a value being present may indicate a first subscription received a shared MCC from a second subscription. For example, the determination module 410 may compare a stored indication of the HPLMN of the first subscription to the shared MCC, and the indication of the HPLMN of the first subscription not matching the shared MCC may indicate the shared MCC is different than the MCC of a HPLMN of the first subscription.

The MCC sharing module 412 may be configured to provide a shared MCC from one subscription to another. For example, the MCC sharing module 412 may store a shared MCC determined by one subscription in a memory location dedicated to storing shared MCCs. In this manner, other subscriptions may be provided the shared MCC from the memory location and/or by referencing the memory location. The MCC sharing module 412 may be configured to determine a 5GNR band associated with a shared MCC based at least in part on an MCC to band mapping table.

The band mapping module 414 may be configured to create, update, and/or store an MCC to band mapping table in a memory of the wireless device 120. The band mapping module 414 may be configured such that the MCC to band mapping table correlates MCCs and 5GNR bands.

The registration module 416 may be configured to register a subscription with a network. For example, the registration module 416 may be configured to register a subscription with a 5GNR SA network.

The wireless device 120, remote platform(s) 110, and/or external resources 422 may be operatively linked via one or more electronic communication links of the wireless communication network. For example, the wireless communication network may establish links via a network such as the Internet and/or other networks.

The wireless device 120 may include electronic storage 424, one or more processors 426, one or more wireless transceivers 266, and/or other components. The wireless device 120 may include communication lines, or ports to enable the exchange of information with a network and/or other wireless devices. The illustration of wireless device 120 is not intended to be limiting.

Electronic storage 424 may include non-transitory storage media that electronically stores information. Electronic storage 424 may be a memory of the wireless device 120. The electronic storage media of electronic storage 424 may include one or both of system storage that is provided integrally (i.e., substantially non-removable) with wireless device 120 and/or removable storage that is removably connectable to wireless device 120 via, for example, a port (e.g., a universal serial bus (USB) port, a firewire port, etc.) or a drive (e.g., a disk drive, etc.). Electronic storage 424 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 424 may include one or more virtual storage resources (e.g., cloud storage, a virtual private network, and/or other virtual storage resources). Electronic storage 424 may store software algorithms, information determined by processor(s) 426, information received from wireless device 120, information received from remote platform(s) 110, and/or other information that enables wireless device 120 to function as described herein. As an example, electronic storage 424 may store one or more MCC to band mapping table. A MCC to band mapping table may be a configurable table stored in electronic storage 424 that correlates MCCs to 5GNR bands.

The processor(s) 426 may be configured to provide information processing capabilities in wireless device 120. As such, the processor(s) 426 may include one or more of a digital processor, an analog processor, a digital circuit designed to process information, an analog circuit designed to process information, a state machine, and/or other mechanisms for electronically processing information. Although the processor(s) 426 is illustrated as a single entity, this is for illustrative purposes only. In some embodiments, the processor(s) 426 may include a plurality of processing units and/or processor cores. The processing units may be physically located within the same device, or processor(s) 426 may represent processing functionality of a plurality of devices operating in coordination. The processor(s) 426 may be configured to execute modules 408, 410, 412, 414, and/or 416 and/or other modules by software; hardware; firmware; some combination of software, hardware, and/or firmware; and/or other mechanisms for configuring processing capabilities on processor(s) 426. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 408, 410, 412, 414, and/or 416 are illustrated as being implemented within a single processing unit, in embodiments in which the processor(s) 426 includes multiple processing units and/or processor cores, one or more of modules 408, 410, 412, 414, and/or 416 may be implemented remotely from the other modules. The description of the functionality provided by the different modules 408, 410, 412, 414, and/or 416 described below is for illustrative purposes, and is not intended to be limiting, as any of modules 408, 410, 412, 414, and/or 416 may provide more or less functionality than is described. For example, one or more of the modules 408, 410, 412, 414, and/or 416 may be eliminated, and some or all of its functionality may be provided by other modules 408, 410, 412, 414, and/or 416. As another example, the processor(s) 426 may be configured to execute one or more additional modules that may perform some or all of the functionality attributed below to one of the modules 408, 410, 412, 414, and/or 416.

Figure 5:
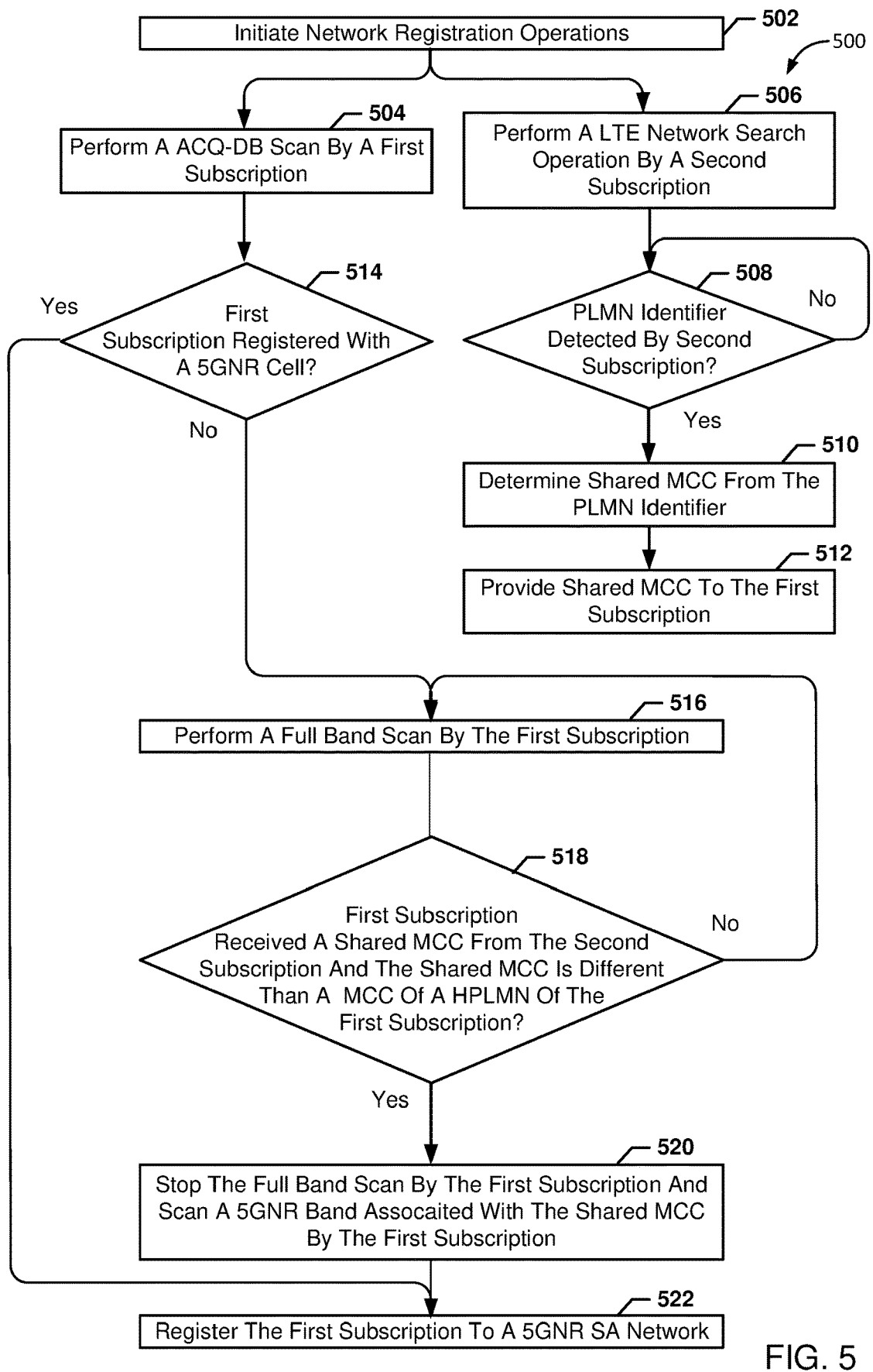
FIG. 5 is a process flow diagram illustrating a method for supporting registration in a fifth generation (5G) new radio (NR) (5GNR) standalone (SA) network in accordance with various embodiments.

FIG. 5 is a process flow diagram illustrating a method 500 that may be performed by a processor of a wireless device for supporting registration in a 5GNR SA network. With reference to FIGS. 1-5, the method 500 may be implemented by a processor (such as 210, 212, 214, 216, 218, 252, 260, 426) of a wireless device (such as the wireless device 120, 120a-120e, 200, 320). In some embodiments, the operations of method 500 may be performed by a processor of a wireless device that is a MSMS wireless device in which at least two SIMs are associated with a shared RF resource. As a specific example, the operations of method 500 may be performed by a multi-SIM wireless device configured with a first subscription, such as a 5GNR subscription associated with a 5GNR SIM, and a second subscription, such as an LTE subscription associated with an LTE SIM.

In block 502, the processor may initiate network registration operations. Network registration operations may include scanning operations to register with a network via one or more subscriptions. Network registration operations may be triggered in response to various events, including the wireless device being powered on or restarted, reentering a service area, or otherwise needing to restart services on one or more subscriptions.

In block 504, the processor may perform an ACQ-DB scan by a first subscription. The ACQ-DB scan may attempt to register the first subscription with a 5GNR cell. As an example, the ACQ-DB scan may attempt to locate a 5GNR SSB in a 5GNR band associated with a HPLMN and/or a last 5GNR cell the wireless device was camped on.

In block 506, the processor may perform an LTE network search operation by a second subscription. The LTE network search operation may include locating an LTE SSB on an LTE carrier. In some embodiments, the processor may be configured such that the ACQ-DB scan by the first subscription in block 504 and the LTE network search operation by the second subscription in block 506 occur at least partially concurrently. For example, the first subscription and the second subscription may perform a ACQ-DB scan and LTE network search operation concurrently by alternating use of a RF resource until one or both of the subscriptions register with a respective network.

In determination block 508, the processor may determine whether a PLMN identifier is detected by the second subscription. For example, the processor may determine whether a PLMN identifier was received in a SIB1 received from an LTE network.

Until a PLMN identifier is detected by the second subscription (i.e., so long as determination block 508="No"), the processor may await detection of a PLMN identifier and continue to determine whether a PLMN identifier is detected by the second subscription in determination block 508.

In response to determining that a PLMN identifier is detected by the second subscription (i.e., determination block 508="Yes"), the processor may determine a shared MCC from the PLMN identifier in block 510. For example, the processor may extract an MCC from a PLMN identifier to determine a shared MCC from the PLMN identifier.

In block 512, the processor may provide the shared MCC to the first subscription. For example, the processor may store a shared MCC determined in a memory location dedicated to storing shared MCCs. In this manner, other subscriptions may be provided the shared MCC from the memory location and/or by referencing the memory location.

In determination block 514, the processor may determine whether the first subscription registered with a 5GNR cell. The processor may determine whether the first subscription registered with a 5GNR cell by determining whether the first subscription exchange initial registration messages, such as SIBs, with a 5GNR cell.

In response to determining that the first subscription registered with a 5GNR cell (i.e., determination block 514="Yes"), the processor may register the first subscription to a 5GNR SA network in block 522.

In response to determining that the first subscription failed to registered with a 5GNR cell during an ACQ-DB scan by the first subscription (i.e., determination block 514="No"), the processor may perform a full band scan by the first subscription in block 516. A full band scan may be a scan of all 5GNR bands supported by the wireless device. Specifically, a full band scan may be a scan of all GSCNs of all bands supported by the wireless device.

In determination block 518, the processor may determine whether the first subscription received a shared MCC from the second subscription and the shared MCC is different than an MCC of a HPLMN of the first subscription. For example, the determination module 410 may determine whether a value is stored in a memory location dedicated to storing shared MCCs and a value being present may indicate a first subscription received a shared MCC from a second subscription. For example, the determination module 410 may compare a stored indication of the HPLMN of the first subscription to the shared MCC, and the indication of the HPLMN of the first subscription not matching the shared MCC may indicate the shared MCC is different than the MCC of a HPLMN of the first subscription.

In response to determining the first subscription did not receive a shared MCC or the shared MCC is the same as a HPLMN of the first subscription (i.e., determination block 518="No"), the processor may continue to perform a full band scan by the first subscription in block 516.

In response to determining the first subscription did receive a shared MCC from the second subscription and the shared MCC is different than the HPLMN of the first subscription (i.e., determination block 518="Yes"), the processor may stop the full band scan of frequencies supporting the first subscription and scan a 5GNR band associated with the shared MCC by the first subscription in block 520. Scanning a 5GNR band associated with the shared MCC may include scanning only a subset of 5GNR bands actually used in the geographic area, such as a country, corresponding to the shared MCC.

In block 522, the processor may register the first subscription to a 5GNR SA network. In this manner, the first subscription may register to the 5GNR SA network by scanning only the subset of 5GNR bands actually used in the geographic area, such as a country, corresponding to the shared MCC.

Figure 6:
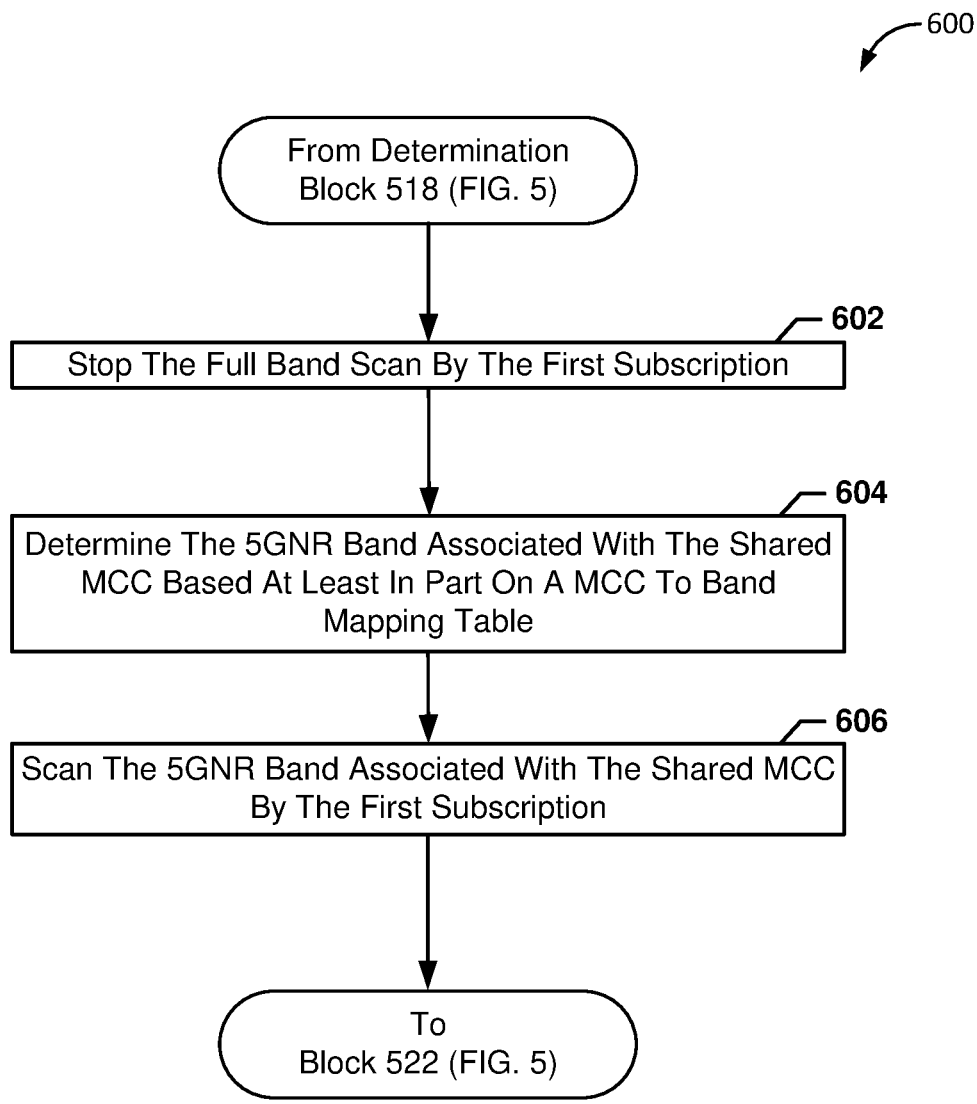
FIG. 6 is a process flow diagram illustrating a method for stopping a full band scan and scanning a 5GNR band associated with a shared mobile country code (MCC) in accordance with various embodiments.

FIG. 6 is a process flow diagram of an example method 600 that may be performed as part of the method 500 for supporting registration in a 5GNR SA network. With reference to FIGS. 1-6, the method 600 may be implemented by a processor (such as 212, 216, 252 or 260) of a wireless device (such as the wireless device 120, 120a-120e, 200, 320). In various embodiments, the method 600 may be performed in conjunction with the operations of methods 500 (FIG. 5). For example, the operations of method 600 may be performed as part of the operations for stopping the full band scan of frequencies supporting the first subscription and scanning the 5GNR band associated with the shared MCC by the first subscription in response to determining that the first subscription received the shared MCC from the second subscription and the shared MCC is different than the MCC of the HPLMN of the first subscription in block 520 (FIG. 5). In some embodiments, the operations of method 600 may be performed by a processor of a wireless device that is a MSMS wireless device in which at least two SIMs are associated with a shared RF resource. As a specific example, the operations of method 600 may be performed by a multi-SIM wireless device configured with a first subscription, such as a 5GNR subscription associated with a 5GNR SIM, and a second subscription, such as an LTE subscription associated with an LTE SIM.

In block 602, the processor may stop the full band scan of frequencies supporting the first subscription. Stopping the full band scan of frequencies supporting the first subscription may include stopping operations to find 5GNR SSBs in carrier frequencies supported by the wireless device.

In block 604, the processor may determine the 5GNR band associated with the shared MCC based at least in part on an MCC to band mapping table. For example, once a shared MCC is determined by a subscription, that shared MCC may be compared to the MCC to band mapping table to find the MCC in the MCC to band mapping table matching the shared MCC. The 5GNR band associated with the MCC matching the shared MCC may be determined to be the 5GNR band associated with the share MCC.

In block 606, the processor may scan the 5GNR band associated with the shared MCC by the first subscription. Scanning a 5GNR band associated with the shared MCC may include scanning only a subset of 5GNR bands actually used in the geographic area, such as a country, corresponding to the shared MCC.

The processor may then perform operations of block 522 of the method 500 as described.

Figure 7:
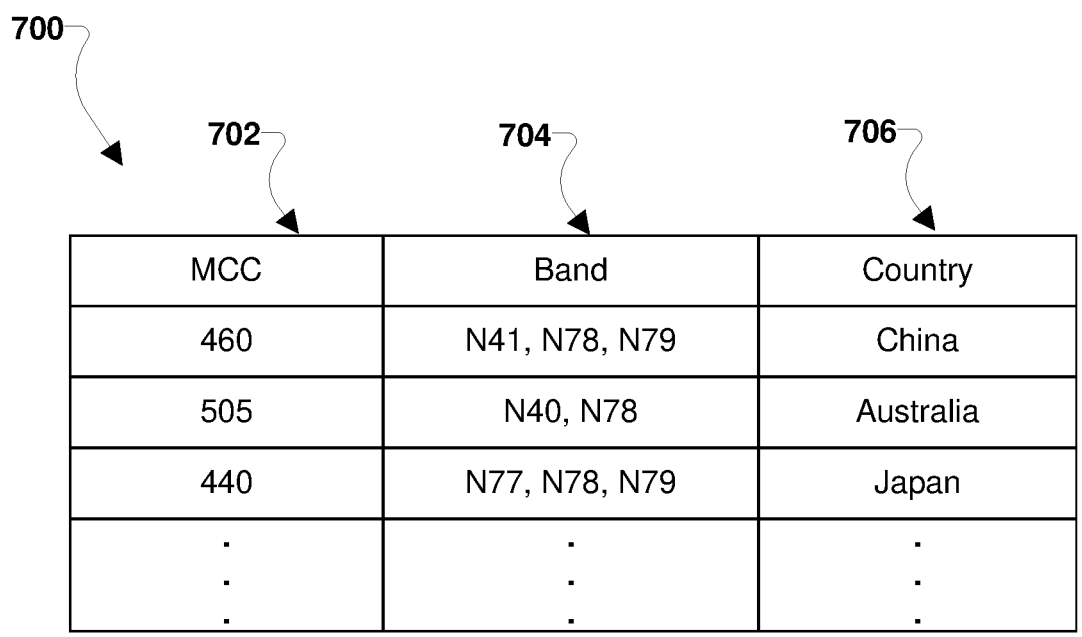
FIG. 7 is a block diagram of an example MCC to band mapping table in accordance with various embodiments.

FIG. 7 is a block diagram of an example MCC to band mapping table 700 in accordance with various embodiments. With reference to FIG. 7, the MCC to band mapping table 700 may be used to determine a 5GNR band associated with the shared MCC, for example according to the operations of method 600 as described. The MCC to band mapping table 700 may correlate MCCs 702, to 5GNR bands 704, to countries 706. The MCC to band mapping table 700 may be a configurable table stored in a memory of a wireless device (such as the wireless device 120, 120a-120e, 200, 320)

Figure 8:
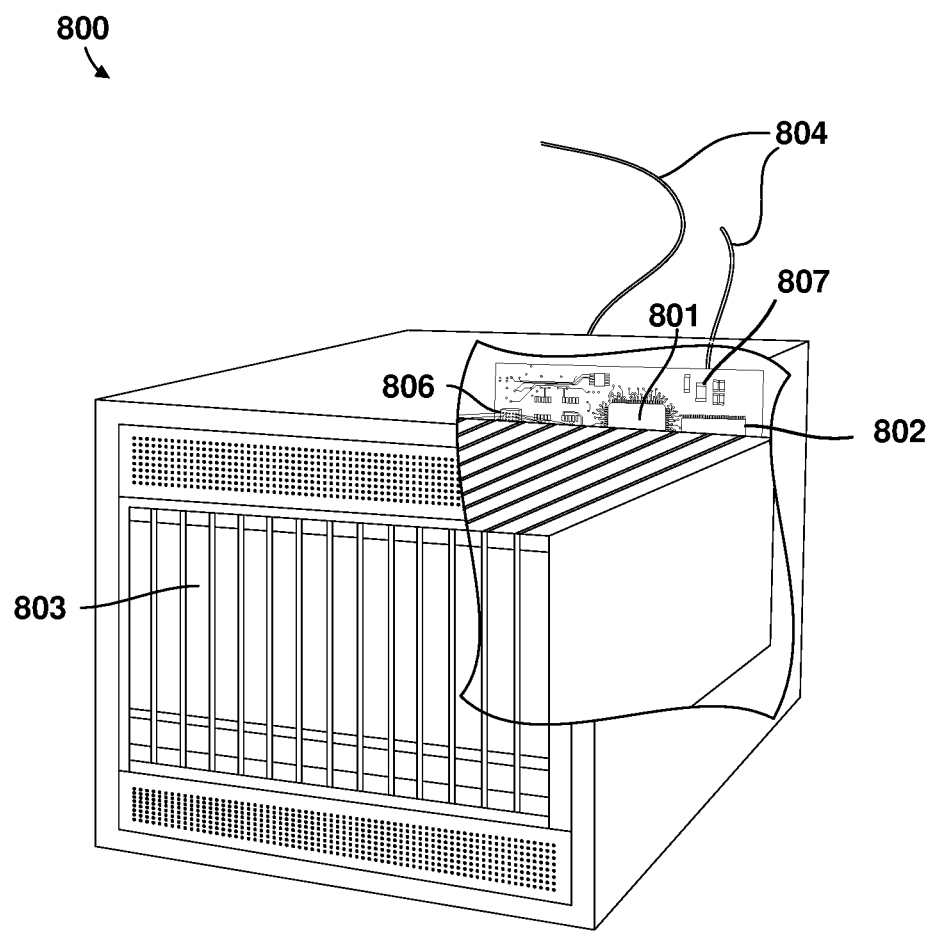
FIG. 8 is a component block diagram of a network computing device suitable for use with various embodiments.

FIG. 8 is a component block diagram of a network computing device 800 suitable for use with various embodiments. Such network computing devices may include at least the components illustrated in FIG. 8. With reference to FIGS. 1-8, the network computing device 800 may include a processor 801 coupled to volatile memory 802 and a large capacity nonvolatile memory, such as a disk drive 803. The network computing device 800 may also include a peripheral memory access device such as a floppy disc drive, compact disc (CD) or digital video disc (DVD) drive 806 coupled to the processor 801. The network computing device 800 may also include network access ports 804 (or interfaces) coupled to the processor 801 for establishing data connections with a network, such as the Internet and/or a local area network coupled to other system computers and servers. The network computing device 800 may include one or more antennas 807 for sending and receiving electromagnetic radiation that may be connected to a wireless communication link. The network computing device 800 may include additional access ports, such as USB, Firewire, Thunderbolt, and the like for coupling to peripherals, external memory, or other devices.

Figure 9:
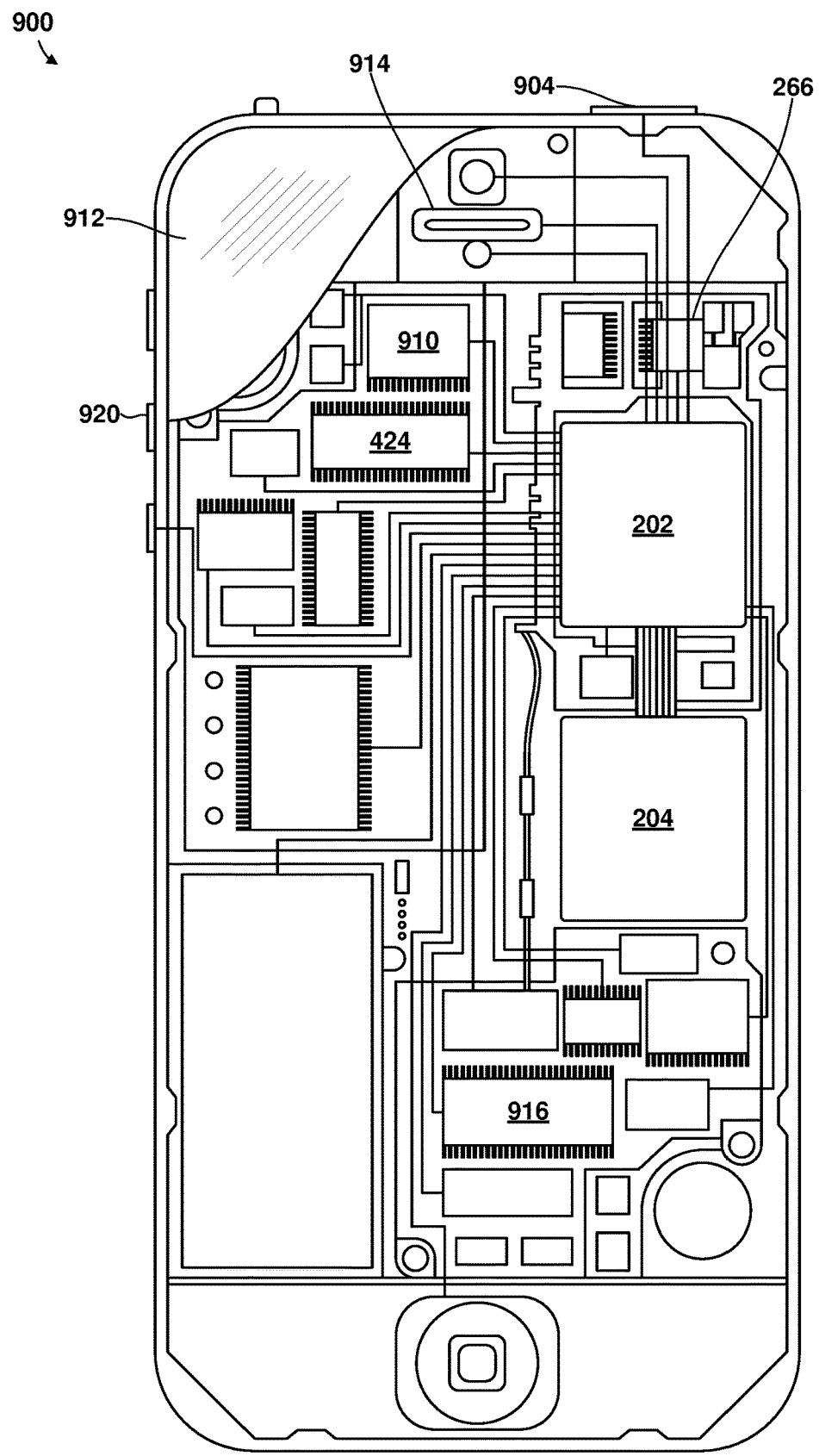
FIG. 9 is a component block diagram of a wireless device suitable for use with various embodiments.

FIG. 9 is a component block diagram of a wireless device 900 suitable for use with various embodiments. With reference to FIGS. 1-9, various embodiments may be implemented on a variety of wireless devices 800 (e.g., the wireless device 120a-120e, 200, 320, 120), an example of which is illustrated in FIG. 8 in the form of a smartphone. The wireless device 900 may include a first SOC 202 (e.g., a SOC-CPU) coupled to a second SOC 204 (e.g., a 5G capable SOC). The first and second SOCs 202, 204 may be coupled to internal memory 424, 916, a display 912, and to a speaker 914. Additionally, the wireless device 900 may include an antenna 904 for sending and receiving electromagnetic radiation that may be connected to a wireless transceiver 266 coupled to one or more processors in the first and/or second SOCs 202, 204. The wireless device 900 may also include menu selection buttons or rocker switches 920 for receiving user inputs.

The wireless device 900 also includes a sound encoding/decoding (CODEC) circuit 910, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 910 may include a digital signal processor (DSP) circuit (not shown separately).

The processors of the wireless network computing device 800 and the wireless device 900 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Software applications may be stored in the memory 424, 916 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), LTE systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general Packet Radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 500 and 600 may be substituted for or combined with one or more operations of the methods 500 and 600.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for supporting registration in a fifth generation (5G) new radio (NR) (5GNR) standalone (SA) network by one or more processors of a multi-subscriber identity module (SIM) wireless device configured with a first subscription and a second subscription, comprising:
performing an acquisition database (ACQ-DB) scan of one or more first frequencies supporting the first subscription;
initiating a full band scan of frequencies supporting the first subscription in response to failing to register with a 5GNR cell during the ACQ-DB scan;
stopping the full band scan of frequencies supporting the first subscription based at least in part on a determination that a shared mobile country code (MCC) of the first subscription is from the second subscription and that the shared MCC is different than an MCC of a home public land mobile network (HPLMN) of the first subscription; and
scanning a 5GNR band associated with the shared MCC of the first subscription.

2. The method of claim 1, further comprising:
providing the shared MCC from the second subscription to the first subscription in response to the second subscription detecting a public land mobile network (PLMN) identifier of a Long Term Evolution (LTE) network during an LTE network search operation of one or more second frequencies supporting the second subscription, wherein the shared MCC is an MCC included in the PLMN identifier of the LTE network.

3. The method of claim 2, wherein the ACQ-DB scan of the one or more first frequencies supporting the first subscription and the LTE network search operation of one or more second frequencies supporting the second subscription occur at least partially concurrently.

4. The method of claim 1, wherein
the 5GNR band is associated with the shared MCC based at least in part on an MCC to band mapping table.

5. The method of claim 4, wherein the MCC to band mapping table is a configurable table correlating MCCs and 5GNR bands stored in a memory of the multi-SIM wireless device.

6. The method of claim 1, further comprising:
registering to a 5GNR SA network in response to scanning the 5GNR band associated with the shared MCC, wherein the registering to the 5GNR SA network is associated with the first subscription.

7. The method of claim 1, wherein the first subscription is associated with a 5GNR SIM and the second subscription is associated with a Long Term Evolution (LTE) SIM.

8. The method of claim 7, wherein the 5GNR SIM and the LTE SIM share a radio frequency (RF) resource.

9. A wireless device, comprising:
at least one multi-subscriber identity module (SIM) having stored thereon information supporting a first subscription and a second subscription, wherein the first subscription supports service on a fifth generation (5G) new radio (NR) (5GNR) standalone (SA) network;
at least radio frequency (RF) resource; and
one or more processors coupled to the at least one multi-SIM and the at least one RF resource, and configured with processor-executable instructions to cause the wireless device to:
perform an acquisition database (ACQ-DB) scan of one or more first frequencies supporting the first subscription;
initiate a full band scan of frequencies supporting the first subscription in response to failing to register with a 5GNR cell during the ACQ-DB scan;
stop the full band scan of frequencies supporting the first subscription based at least in part on a shared mobile country code (MCC) of the first subscription being from the second subscription and the shared MCC being different than an MCC of a home public land mobile network (HPLMN) of the first subscription; and
scan a 5GNR band associated with the shared MCC of the first subscription.

10. The wireless device of claim 9, wherein the one or more processors are configured with processor-executable instructions to cause the wireless device to:
provide the shared MCC from the second subscription to the first subscription in response to the second subscription detecting a public land mobile network (PLMN) identifier of a Long Term Evolution (LTE) network during an LTE network search operation of one or more second frequencies supporting the second subscription, wherein the shared MCC is an MCC included in the PLMN identifier of the LTE network.

11. The wireless device of claim 10, wherein the one or more processors are configured with processor-executable instructions to cause the wireless device to perform the ACQ-DB scan of the one or more first frequencies supporting the first subscription and the LTE network search operation of one or more second frequencies supporting the second subscription to occur at least partially concurrently.

12. The wireless device of claim 9, wherein
the 5GNR band is associated with the shared MCC based at least in part on an MCC to band mapping table.

13. The wireless device of claim 12, wherein the MCC to band mapping table is a configurable table correlating MCCs and 5GNR bands stored in a memory of the multi-SIM wireless device.

14. The wireless device of claim 9, wherein the one or more processors are configured with processor-executable instructions to cause the wireless device to:
register to a 5GNR SA network in response to scanning the 5GNR band associated with the shared MCC, wherein a registration to the 5GNR SA network is associated with the first subscription.

15. The wireless device of claim 9, wherein the first subscription is associated with a 5GNR SIM of the at least one multi-SIM and the second subscription is associated with a Long Term Evolution (LTE) SIM of the at least one multi-SIM.

16. The wireless device of claim 15, wherein the 5GNR SIM and the LTE SIM share the at least one RF resource.

17. One or more non-transitory, processor-readable media comprising processor-executable instructions that, when executed by one or more processors of a multi-subscriber identity module (SIM) wireless device configured with a first subscription and a second subscription, cause the multi-SIM wireless device to perform operations comprising:
performing an acquisition database (ACQ-DB) scan of one or more first frequencies supporting the first subscription;
initiating a full band scan of frequencies supporting the first subscription in response to failing to register with a fifth generation (5G) new radio (NR) (5GNR) standalone (SA) network cell during the ACQ-DB scan;
stopping the full band scan of frequencies supporting the first subscription based at least in part a shared mobile country code (MCC) of the first subscription being from the second subscription and the shared MCC being different than an MCC of a home public land mobile network (HPLMN) of the first subscription; and
scanning a 5GNR band associated with the shared MCC of the first subscription.

18. The one or more non-transitory, processor-readable media of claim 17, wherein the processor-executable instructions, when executed by the one or more processors of the multi-SIM wireless device, are configured to cause the multi-SIM wireless device to perform operations further comprising:
providing the shared MCC from the second subscription to the first subscription in response to the second subscription detecting a public land mobile network (PLMN) identifier of a Long Term Evolution (LTE) network during an LTE network search operation of one or more second frequencies supporting the second subscription, wherein the shared MCC is an MCC included in the PLMN identifier of the LTE network.

19. The one or more non-transitory, processor-readable media of claim 18, wherein the processor-executable instructions, when executed by the one or more processors of the multi-SIM wireless device, are configured to cause the multi-SIM wireless device to perform operations further such that the ACQ-DB scan of the one or more first frequencies supporting the first subscription and the LTE network search operation of the one or more second frequencies supporting the second subscription occur at least partially concurrently.

20. The one or more non-transitory, processor-readable media of claim 17, wherein
the 5GNR band is associated with the shared MCC based at least in part on an MCC to band mapping table.

21. The one or more non-transitory, processor-readable media of claim 20, wherein the MCC to band mapping table correlating MCCs and 5GNR bands is a configurable table stored in a memory of the multi-SIM wireless device.

22. The one or more non-transitory, processor-readable media of claim 17, wherein the processor-executable instructions, when executed by the one or more processors of the multi-SIM wireless device, are configured to cause the multi-SIM wireless device to perform operations further comprising:
registering by the first subscription to a 5GNR SA network in response to scanning the 5GNR band associated with the shared MCC.

23. The one or more non-transitory, processor-readable media of claim 17, wherein the first subscription is associated with a 5GNR SIM and the second subscription is associated with a Long Term Evolution (LTE) SIM.

24. A multi-subscriber identity module (SIM) wireless device configured with a first subscription and a second subscription, comprising:

means for performing an acquisition database (ACQ-DB) scan of one or more first frequencies supporting the first subscription;

means for initiating a full band scan of frequencies supporting the first subscription in response to failing to register with a 5GNR cell during the ACQ-DB scan;

means for stopping the full band scan of frequencies supporting the first subscription based at least in part on a shared mobile country code (MCC) of the first subscription being from the second subscription and the shared MCC being different than an MCC of a home public land mobile network (HPLMN) of the first subscription; and means for scanning a 5GNR band associated with the shared MCC of the first subscription.

25. The multi-SIM wireless device of claim 24, further comprising:

means for providing the shared MCC from the second subscription to the first subscription in response to the second subscription detecting a public land mobile network (PLMN) identifier of a Long Term Evolution (LTE) network during an LTE network search operation of one or more second frequencies supporting the second subscription, wherein the shared MCC is an MCC included in the PLMN identifier of the LTE network.

26. The multi-SIM wireless device of claim 24, wherein the 5GNR band is associated with the shared MCC based at least in part on an MCC to band mapping table.

27. The multi-SIM wireless device of claim 26, wherein the MCC to band mapping table is a configurable table correlating MCCs and 5GNR bands stored in a memory of the multi-SIM wireless device.

28. The multi-SIM wireless device of claim 24, further comprising:

means for registering to a 5GNR SA network in response to scanning the 5GNR band associated with the shared MCC, wherein a registration to the 5GNR SA network is associated with the first subscription.

29. The multi-SIM wireless device of claim 24, wherein the first subscription is associated with a 5GNR SIM and the second subscription is associated with a Long Term Evolution (LTE) SIM.

30. The multi-SIM wireless device of claim 15, wherein the 5GNR SIM and the LTE SIM share a radio frequency (RF) resource.

* * * * *